United States Patent Office 3,030,343
Patented Apr. 17, 1962

3,030,343
CROSS-LINKED MALEIC ANHYDRIDE
POLYMERS
John F. Jones, Cuyahoga Falls, Ohio, assignor to The
B. F. Goodrich Company, New York, N.Y., a corporation of New York
No Drawing. Filed Dec. 19, 1958, Ser. No. 781,455
12 Claims. (Cl. 260—78.5)

This invention relates to polymeric emulsifying, emulsion stabilizing and suspending agents adapted to emulsify and suspend or disperse both liquid oily materials and solid substances, and to a method of stabilizing emulsions and suspensions. The invention more particularly relates to insoluble but hydrophilic emulsifying and suspending agents which are interpolymers of an alpha-beta unsaturated dicarboxylic acid anhydride such as maleic anhydride, a vinyl alkyl ether and a cross-linking agent.

This application is a continuation-in-part of my U.S. patent application Serial No. 404,784, filed January 18, 1954.

I have discovered that highly useful water-swellable polymers are obtained when substantially equimolar weights of an alpha-beta unsaturated dicarboxylic acid anhydride such as maleic anhydride and a vinyl alkyl ether and certain proportions of a cross-linking agent selected from the class consisting of methylene-bis-acrylamide, methylene-bis-methacrylamide, triacrylyl triazine, trimethacrylyl triazine, and hexaallyl trimethylene trisulfone are interpolymerized. The resulting polymers are substantially insoluble in water and in most common organic solvents. Depending upon the proportion of the cross-linking agent utilized, however, the polymers vary considerably in properties. The amount of cross-linking agent can vary from about 0.01% to about 10% by weight of the remaining monomers. With from about 0.5 to about 6% by weight of cross-linking agent, insoluble gel-like polymers are obtained which, per se, and especially in the form of their alkali metal and ammonium salts, have the ability to absorb large quantities of water with consequent many times increase in volume. Such polymers somewhat resemble, but are greatly superior to, gum tragacanth, gum karaya and other naturally occurring more or less insoluble gum-like substances conventionally used as bodying and suspending agents. The high-swelling polymers of this invention are extremely useful in various mucilaginous or colloidal gel-like applications such as dentrifrices, creams, ointments and printing paste thickeners.

The dicarboxylic acid anhydrides useful in the production of the interpolymers of this invention have the general structure

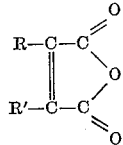

wherein R and R' are selected from the group consisting of hydrogen, halogen, cyanogen (—C≡N), alkyl, aryl, alkaryl, aralkyl and cycloaliphatic groups. Illustrative anhydrides of this structure include maleic anhydride itself, chloromaleic anhydride, 2,3-dicyano maleic anhydride, dimethyl maleic anhydride, diphenyl maleic anhydride, dibenzyl maleic anhydride, di(p-methyl phenyl) maleic anhydride, dicyclohexyl maleic anhydride and others. Maleic anhydride, because of its ready availability, low cost and highly satisfactory performance is the preferred monomer of this group.

In the production of the interpolymers for use in this invention any of the vinyl alkyl ethers containing from 3 to 12 carbon atoms may be utilized. Included within this class are vinyl methyl ether, vinyl ethyl ether, vinyl isopropyl ether, vinyl n-butyl ether, vinyl isobutyl ethers, vinyl hexyl ethers, vinyl 2-ethyl hexyl ethers, and vinyl decyl ethers. It is preferred, however, to utilize the lower vinyl alkyl ethers containing from 3 to 6 carbon atoms, that is, methyl vinyl ether, vinyl ethyl ether, vinyl isopropyl ether, vinyl isobutyl ethers, vinyl n-butyl ethers and others. Of these, vinyl methyl ether is much preferred because of its favorable reaction characteristics with maleic anhydride and because of its generally lower cost.

The third essential monomeric material is a polymerizable material containing a plurality of polymerizable $CH_2=C<$ groupings selected from the class consisting of methylene-bis-acrylamide, methylene-bis-methacrylamide, triacrylyl triazine, trimethacrylyl triazine, and hexaallyl trimethylene trisulfone. The amount of cross-linking agent can vary from about 0.01% to about 10% by weight of the remaining monomers.

Since the maleic acid type of dicarboxylic acid anhydride evidences a strong tendency to form alternating copolymers with most of the monomers copolymerizable therewith, it is difficult to utilize monomeric proportions other than those adapted to yield the alternating polymer. In multicomponent interpolymers such as are described above, it is generally preferred, therefore, to utilize monomeric mixtures in which alpha-beta unsaturated acid anhydride and vinyl alkyl ether monomers are present in substantially equimolar proportions and varying the amount of cross-linking agent to obtain the properties desired in the polymer. If proportions of alpha-beta unsaturated acid and vinyl alkyl ether other than equimolar are utilized, the yield of polymer is greatly reduced and the polymer obtained will usually contain a relatively greater proportion of cross-linking agent than is represented in the original monomeric charge. In addition to the three essential monomers described above, up to 20% of the total monomeric mixture may consist of one or more other monoolefinic monomers such as styrene, acrylonitrile, vinyl chloride, vinylidene chloride, vinyl acetate, vinyl benzoate, diethyl maleate, ethylene, isobutylene, acrylic acid, and others. It is greatly preferred, however, that only the three essential monomeric materials be utilized.

The following specific examples, which are merely illustrative of the invention, will demonstrate the preparation of illustrative polymers and various manners of utilizing them in the preparation of mucilaginous compositions.

*Example I*

A series of terpolymers were prepared by reacting molar equivalents of maleic anhydride and methyl vinyl ether with varying amounts of methylene-bis-acrylamide. The polymerization reactions were carried out in glass equipment at autogenous pressure and under conditions that were as uniform as possible. In each instance the ingredients were blended in benzene at room temperature, air was swept out of the mixture, the reactor sealed and then the temperature was adjusted to 50° C.–100° C. for periods of time ranging from about 12 to 24 hours. A free radical catalyst, benzoyl peroxide, at a concentration of 1.0% based on the combined weight of maleic anhydride and methyl vinyl ether was employed.

The polymers formed as finely divided white particles which were insoluble in benzene. After the polymerization reaction is complete the polymers can be readily filtered and dried.

Aqueous mucilages of the 75% sodium salts were prepared and the viscosities were determined on a model RVF Brookfield viscometer using a number 7 spindle at 10 r.p.m. The table below shows the proportion of ingredients used in preparing the polymers and the viscosity of the mucilages made with various amounts of the partial salt in water.

| Ingredient | Parts by Weight | | | | | |
|---|---|---|---|---|---|---|
| | A | B | C | D | E | F |
| Maleic anhydride | 62.8 | 62.8 | 62.8 | 62.8 | 62.8 | 62.8 |
| Methyl vinyl ether | 37.2 | 37.2 | 37.2 | 37.2 | 37.2 | 37.2 |
| Methylene-bis-acrylamide | 1 | 2 | 3 | 4 | 5 | 6 |
| Benzoyl peroxide | 1 | 1 | 1 | 1 | 1 | 1 |
| Benzene | 880 | 880 | 880 | 880 | 880 | 880 |

| Percent Polymer Salt in Mucilage | Brookfield Viscosity (poises) | | | | | |
|---|---|---|---|---|---|---|
| | A | B | C | D | E | F |
| 1.5 | 360 | 920 | 1,800 | 1,120 | 2,160 | 1,010 |
| 1.0 | 280 | 720 | 1,520 | 640 | 1,520 | 360 |
| 0.5 | 160 | 280 | 720 | 48 | 160 | 24 |

*Example II*

Methylene-bis-methacrylamide can also be used as a cross-linking agent for maleic anhydride-alkyl vinyl ether polymers. A series of cross-linked polymers were prepared by the procedure described in Example I in accordance with the recipes below.

| Ingredient | Parts by Weight | | | | | |
|---|---|---|---|---|---|---|
| | A | B | C | D | E | F |
| Maleic anhydride | 62.8 | 62.8 | 62.8 | 62.8 | 62.8 | 62.8 |
| Methyl vinyl ether | 37.2 | 37.2 | 37.2 | 37.2 | 37.2 | 37.2 |
| Methylene-bis-methacrylamide | 0.5 | 1.0 | 2.0 | 3.0 | 4.0 | 6.0 |
| Benzoyl peroxide | 1.0 | 1.0 | 1.0 | 1.0 | 1.0 | 1.0 |
| Benzene | 880 | 880 | 880 | 880 | 880 | 880 |

| Percent Polymer in Water Mucilage | Brookfield Viscosity (poises) | | | | | |
|---|---|---|---|---|---|---|
| | A | B | C | D | E | F |
| 1.5 | 96 | 240 | 716 | 916 | 524 | 264 |
| 1.0 | 72 | 200 | 440 | 464 | 320 | 240 |
| 0.5 | 48 | 112 | 160 | 136 | 56 | 48 |

The viscosities were run on a 75% neutralized sodium salt of the polymers.

*Example III*

Maleic anhydride-methyl vinyl ether-hexaallyl trimethylene trisulfone terpolymers were prepared according to the procedure described in Example I wherein the following recipes were employed.

| Ingredient | Parts by Weight | |
|---|---|---|
| Maleic anhydride | 62.8 | 62.8 |
| Methyl vinyl ether | 37.2 | 37.2 |
| Hexaallyl trimethylene trisulfone | 2.0 | 4.0 |
| Benzoyl peroxide | 2.0 | 2.0 |
| Benzene | 880 | 880 |

| Percent Polymer in Water | Brookfield Viscosity (poises) | |
|---|---|---|
| 1.5 | 240 | 320 |
| 1.0 | 160 | 280 |
| 0.5 | 80 | 200 |

These mucilages were prepared from a 75% neutralized partial sodium salt of the polymer. The polymer made with 4% cross-linking agent makes an excellent suspending material in view of its flat viscosity v. concentration curve.

*Example IV*

1,3,5-triacrylyl triazine and 1,3,5-trimethacrylyl triazine yield cross-linked polymers with maleic anhydride and lower alkyl vinyl ethers.

| Ingredient | Parts by Weight | |
|---|---|---|
| Maleic anhydride | 62.8 | 62.8 |
| Methyl vinyl ether | 37.2 | 37.2 |
| 1,3,5-triacrylyl triazine | 6.0 | |
| 1,3,5-trimethacrylyl triazine | | 6.0 |
| Benzoyl peroxide | 1.0 | 1.0 |
| Benzene | 880 | 880 |

| 75% Neutralized Polymer in Water | Brookfield Viscosity (poises) | |
|---|---|---|
| 1.5 | 280 | 1,232 |
| 1.0 | 240 | 1,216 |
| 0.5 | 26 | 944 |

The acid anhydride form polymer was prepared in benzene and thereafter was 75% neutralized with sodium carbonate. Each of the mucilages was smooth, but those containing the trimethacrylyl triazine were exceptionally so in this respect.

I claim:

1. A resinous interpolymer of a monomeric mixture comprising (1) substantially equimolar weights of an alpha-beta olefinically unsaturated dicarboxylic acid anhydride and a vinyl alkyl ether and (2) from about 0.01% to about 10% by weight based on (1) of a cross-linking agent selected from the class consisting of methylene-bis-acrylamide, methylene-bis-methacrylamide, triacrylyl triazine, trimethacrylyl triazine, and hexaallyl trimethylene trisulfone.

2. A resinous interpolymer of a monomeric mixture comprising (1) substantially equimolar weights of an alpha-beta olefinically unsaturated dicarboxylic acid anhydride conforming to the structure

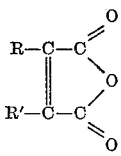

wherein R and R' are selected from the group consisting of hydrogen, halogen, cyanogen, alkyl, aryl, alkaryl, aralkyl, and cycloaliphatic groups and a vinyl alkyl ether having from 3 to 12 carbon atoms and (2) from about 0.01 to about 10% by weight based on (1) of a cross-linking agent selected from the class consisting of methylene-bis-acrylamide, methylene-bis-methacrylamide, triacrylyl triazine, trimethacrylyl triazine, and hexaallyl trimethylene trisulfone.

3. A resinous interpolymer of a monomeric mixture comprising (1) substantially equimolar weights of maleic anhydride and a vinyl alkyl ether having from 3 to 6 carbon atoms and (2) from about 0.01 to about 10% by weight based on (1) of a cross-linking agent selected from the class consisting of methylene-bis-acrylamide, methylene-bis-methacrylamide, triacrylyl triazine, trimethacrylyl triazine, and hexaallyl trimethylene trisulfone.

4. A resinous interpolymer of a monomeric mixture comprising (1) substantially equimolar weights of maleic anhydride and methyl vinyl ether and (2) from about 0.5 to about 6% by weight based on (1) of a cross-linking agent selected from the class consisting of methylene-bis-acrylamide, methylene-bis-methacrylamide, triacrylyl triazine, trimethacrylyl triazine, and hexaallyl trimethylene trisulfone.

5. A resinous interpolymer of a monomeric mixture comprising (1) substantially equimolar weights of maleic anhydride and methyl vinyl ether and (2) from about 0.5% to about 6% by weight based on (1) of methylene-bis-acrylamide.

6. A resinous interpolymer of a monomeric mixture comprising (1) substantially equimolar weights of maleic anhydride and methyl vinyl ether and (2) from about 0.5 to about 6% by weight based on (1) of methylene-bis-methacrylamide.

7. A resinous interpolymer of a monomeric mixture comprising (1) substantially equimolar weights of maleic anhydride and methyl vinyl ether and (2) from about 0.5% to about 6% by weight based on (1) of triacrylyl triazine.

8. A resinous interpolymer of a monomeric mixture comprising (1) substantially equimolar weights of maleic anhydride and methyl vinyl ether and (2) from about 0.5% to about 6% by weight based on (1) of trimethacrylyl triazine.

9. A resinous interpolymer of a monomeric mixture comprising (1) substantially equimolar weights of maleic anhydride and methyl vinyl ether and (2) from about 0.5% to about 6% by weight based on (1) of hexaallyl trimethylene trisulfone.

10. The method for preparing a resinous interpolymer of (1) substantially equimolar weights of an alpha-beta olefinically unsaturated dicarboxylic acid anhydride and a vinyl alkyl ether and (2) from about 0.01% to about 10% by weight based on (1) of a cross-linking agent selected from the class consisting of methylene-bis-acrylamide, methylene-bis-methacrylamide, triacrylyl triazine, trimethacrylyl triazine, and hexaallyl trimethylene trisulfone, said method comprising conducting the polymerization in a hydrocarbon diluent at a temperature of from about 25° C. to about 100° C. in the present of a three-radical initiator.

11. The method of claim 10 wherein the hydrocarbon diluent is benzene.

12. The method of claim 10 wherein the free-radical initiator is benzoyl peroxide.

References Cited in the file of this patent

UNITED STATES PATENTS

| | | |
|---|---|---|
| 2,595,779 | Dudley | May 6, 1952 |
| 2,621,169 | Robinette et al. | Dec. 9, 1952 |
| 2,640,039 | Williams | May 26, 1953 |
| 2,745,813 | Longemann et al. | May 15, 1956 |
| 2,783,212 | Schenell | Feb. 26, 1957 |
| 2,798,053 | Brown | July 2, 1957 |
| 2,892,818 | Lowe et al. | June 30, 1959 |
| 2,923,692 | Ackerman et al. | Feb. 2, 1960 |
| 2,934,525 | Fekete | Apr. 26, 1960 |
| 2,935,484 | Arnold et al. | May 3, 1960 |

UNITED STATES PATENT OFFICE
CERTIFICATE OF CORRECTION

Patent No. 3,030,343                      April 17, 1962

John F. Jones

It is hereby certified that error appears in the above numbered patent requiring correction and that the said Letters Patent should read as corrected below.

Column 6, line 8, for "present" read -- presence --; lines 8 and 9, for "three-radical" read -- free-radical --.

Signed and sealed this 27th day of November 1962.

(SEAL)
Attest:
ESTON G. JOHNSON
Attesting Officer

DAVID L. LADD
Commissioner of Patents